Aug. 18, 1964    R. R. CALACETO    3,145,239
GAS SCRUBBER

Filed Nov. 14, 1960    2 Sheets-Sheet 1

INVENTOR.
RALPH R. CALACETO
BY
Barnes, Kisselle, Raisch & Choate
ATTORNEYS

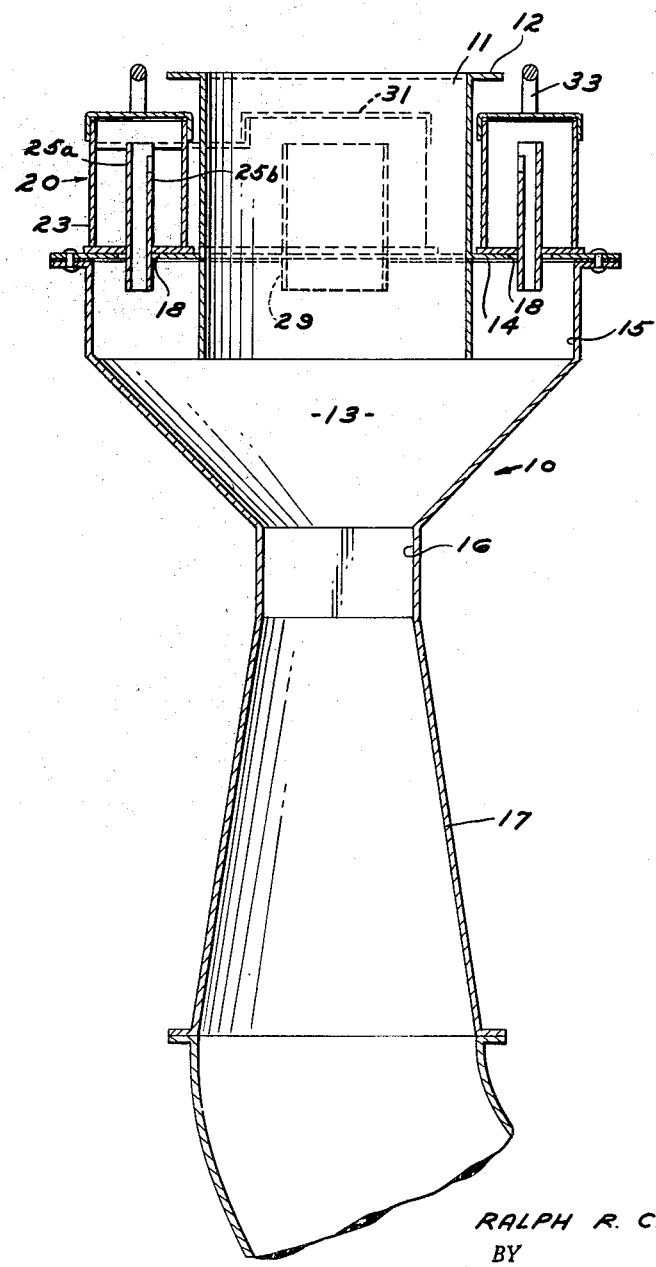

United States Patent Office 3,145,239
Patented Aug. 18, 1964

3,145,239
GAS SCRUBBER
Ralph R. Calaceto, Ridgewood, N.J., assignor, by mesne assignments, to Airetron Engineering Corporation, Ridgewood, N.J., a corporation of New Jersey
Filed Nov. 14, 1960, Ser. No. 68,999
6 Claims. (Cl. 261—112)

This invention relates to gas scrubbers and particularly gas scrubbers of the type wherein gases laden with solids or liquids are intimately mixed with water to remove the solids or liquids that may be present in the form of dirt, dust, mist or the like.

In one type of gas scrubber which has been used successfully, the gases which are laden with solids are moved downwardly into a chamber, the walls of which converge into an orifice. Simultaneously, liquid, such as water, is fed into the chamber and the liquid is intimately mixed with the solid laden gases at the throat of the orifice. The mixing of the liquid with the solid laden gases causes the solids to be agglomerated permitting their removal from the mixture after it has passed downwardly through the orifice. In large gas scrubbers wherein large amounts of liquid are used, it is desirable to recirculate the liquid in order to save the cost of liquid. Where the dust and other solids in the gases are heavy, the resultant liquid that is recirculated contains a substantial amount of sludge. Thus, when nozzles or other pipes are used to feed the liquid to the scrubber, difficulty is experienced with clogging of the nozzles or pipes.

It is an object of this invention to provide a gas scrubber including novel means for feeding the liquid to the gas scrubber.

It is a further object of the invention to provide such a gas scrubber wherein the liquid feeding device is not subject to clogging because of the sludge laden liquid.

It is a further object of the invention to provide a gas scrubber wherein the liquid feeding device is easily cleaned.

It is a further object of the invention to provide such a gas scrubber wherein the liquid feeding device may be easily inspected.

It is a further object of the invention to provide such a gas scrubber wherein the liquid feeding device may easily be removed and replaced with a liquid feeding device of a different size in order to provide a different amount of liquid to the gas scrubber or to permit the cleaning thereof.

Basically, the gas scrubber comprises an inlet tube through which the gases are fed downwardly into a chamber, a top wall to the chamber, converging side walls to the chamber which form a throat, and removable weir boxes positioned on the top wall and adapted to feed water in the form of sheets downwardly through slots in the top wall of the gas scrubber.

In the drawings:

FIG. 3 is a sectional view taken along the line 3—3 in FIG. 1.

Figure 1:
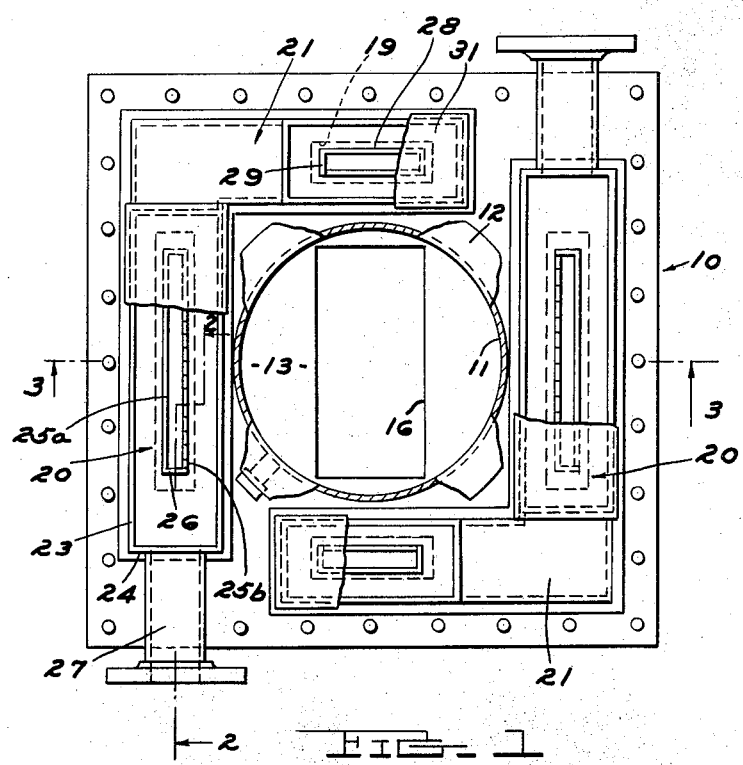
FIG. 1 is a top plan view of a gas scrubber embodying the invention, parts being broken away.
Figure 2:
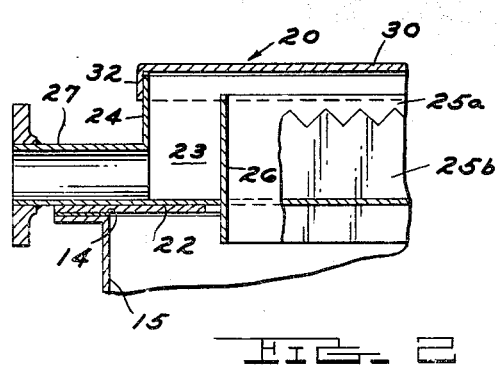
FIG. 2 is a fragmentary sectional view taken along the line 2—2 in FIG. 1.

Referring to the drawings, gas scrubber 10 embodying the invention comprises a cylindrical inlet tube 11 having a laterally extending flange 12. The solid or liquid laden gases are fed downwardly through the tube 12 into a chamber 13 formed by a horizontal top wall 14 and side walls 15 the upper ends of which are vertical and the lower ends of which converge downwardly to form an orifice 16. As shown in FIGS. 1 and 2, orifice 16 is preferably rectangular in cross section, one side being longer than the other. The scrubber also includes a diverging lower section 17 that extends downwardly from the orifice 16.

As shown in FIG. 1, the top wall 14 is rectangular. Top wall 14 includes rectangular slots 18 extending in the direction parallel to the long sides of the orifice 16 and rectangular slots 19 extending in a direction parallel to the short side of the orifice 16. L-shaped weir boxes or compartments 20 are provided on the top wall 14 with one leg thereof in overlying relationship with a slot 18 and the other leg thereof in overlying relationship with a slot 19.

Each weir box 20 comprises an L-shaped bottom wall 22, side walls 23 and end walls 24. In addition, in one leg of the weir box 20, intermediate side walls 25 and intermediate end walls 26 extend upwardly from the bottom wall 22 and through the bottom wall 22 to define a conduit with an opening extending downwardly. Liquid is supplied to each weir box 20 through an inlet tube 27. As shown in FIGS. 2 and 3, one of the intermediate walls 25a extends upwardly beyond the upper end of the opposite intermediate wall 25b so that liquid accumulating in the area surrounding the intermediate walls 25, 26 will overflow the short wall 25b and pass downwardly in the form of a sheet onto the converging portion of the side walls 15. The upper end of the short wall 25b is preferably serrated or notched to produce a weir action facilitating the flow of the liquid in a generally uniform sheet downwardly.

Similarly, immediate side walls 28 and end walls 29 are provided in the other leg of weir box 20 to form a conduit with an opening in overlying relationship to the opening 19 in top wall 14. These walls 28, 29 extend downwardly through the opening 19. The upper end of one of the walls 28 is shorter than the other wall and is notched to provide a weir action.

Portions of top wall 21 overlying the slots 18, 19 are cut away and removable covers 30, 31 are provided on the upper ends of the portions of the walls 23, 24 which extend upwardly above the top wall 21. Each cover 30, 31 includes a peripheral lip 32 and a handle 33.

As the liquid, such as water, is admitted through the inlet pipe 27, it passes to each leg of the weir box 20. The liquid collects to the height of the lower wall 25b and the shorter of the walls 28 and then passes downwardly forming a uniform sheet that contacts the converging walls 15 of the scrubber. It will first be seen that the structure of the invention includes a means situated outwardly beyond the inlet tube 11 and above the converging wall 15 for directing downwardly to the converging wall at an elevation higher than the orifice 16 sheets of liquid which are distributed about the inlet tube 11 and are substantially parallel to the sides of the orifice 16, so as to provide at the orifice 16 liquid which necessarily surrounds the orifice before flowing into the latter, and furthermore it will be seen that this means of the invention which directs sheets of liquid downwardly to the converging walls 15 also compels the liquid which enters through the inlet means 27 to rise to an elevation substantially higher than the inlet means 27 before being directed downwardly to the wall 15 in the form of a sheet, so that in this way any sludge or the like in the liquid will collect in the boxes 23 before it can flow with the liquid into the chamber 13 and furthermore the directing of the liquid in the form of a sheet reliably prevents any clogging of the flow even if there were foreign particles suspended in the liquid. Thus, the structure of the invention acts in two ways to prevent clogging, the one way being the fact that the liquid is compelled to rise substantially above the inlet 27 so that heavier particles in the liquid cannot rise with the liquid, and a second way being the use of a structure which provides sheets of liquid so that small nozzles, tubes or the like, which are likely to become clogged are avoided. This liquid contacts the gases passing downwardly through the inlet tube 11 and intimately mixes with the gases at the orifice 16.

Since the weir boxes rest upon the top wall 14, they can be readily leveled by using shims to provide a uniform flow of liquid downwardly through the openings 18, 19. The removable covers provide for ready inspection of the interior of the weir boxes during operation of the scrubber without affecting the operation. The use of the weir type action permits a separation of the sludge by gravity before the liquid passes over and downwardly into the scrubber.

The sludge can be removed periodically from the weir box while the weir box is in position or the weir box can be lifted off, cleaned and repositioned on the scrubber.

It can thus be seen that there has been provided a gas scrubber wherein the liquid feeding device is supported on the top wall of the scrubber and can be readily removed merely by lifting the weir box from the top wall since there is no other mechanical connection to the top wall. The cover provides for easy access and inspection to the interior of the weir box. Sludge can be removed while the weir box is in position or alternatively, the weir box can be lifted off, cleaned and repositioned on the top wall.

By providing the weir box externally of the scrubber, the advantages are accessibility, inspection and easy maintenance.

I claim:

1. In a gas scrubber, a generally vertical inlet pipe through which a gas which is to be cleaned is adapted to flow downwardly beyond the bottom end of said inlet pipe, a converging tube surrounding the bottom end of said inlet pipe and having an endless converging side wall which converges downwardly to an elevation lower than said bottom end of said inlet pipe and which defines an orifice aligned with said inlet pipe, a compartment located outwardly of said inlet pipe over said converging tube forming an enclosure for receiving liquid, inlet means communicating with said compartment for directing liquid into the latter, said compartment having an elongated conduit providing communication to said converging tube, said conduit having side walls with upper edges in said compartment, one of which has an upper edge lower than the upper edge of the remaining side walls and substantially higher than said inlet means so that the liquid must overflow said one wall before being formed into a sheet which is diverted downwardly to said converging side wall and said orifice so as to mix with and clean the gas which enters through said inlet pipe.

2. In a scrubber as recited in claim 1, said upper edge of said one wall of said conduit being notched.

3. In a scrubber as recited in claim 1, said compartment having a removable cover.

4. In a scrubber as recited in claim 1, there being provided a pair of compartments comprising a pair of substantially L-shaped boxes having legs which are respectively arranged along the sides of a rectangle which surrounds said inlet pipe, and each of said boxes having a single inlet tube which forms said inlet means, said legs of said boxes respectively having said conduits in their interiors, said orifice having sides which are respectively substantially parallel to said conduits.

5. In a scrubber as recited in claim 1, there being provided a plurality of compartments and a plurality of sheets of liquid directed downwardly to said converging side wall, said orifice being of non-circular cross-section and having the configuration of a polygon provided with straight sides.

6. In a scrubber as recited in claim 1, said compartment being mounted on said scrubber in a loose frictional engagement whereby said compartment is bodily removable from the scrubber for cleaning.

References Cited in the file of this patent

UNITED STATES PATENTS

| | | |
|---|---|---|
| 1,213,782 | Thomas | Jan. 23, 1917 |
| 1,916,922 | Dow | July 4, 1933 |
| 2,077,427 | Lissman | Apr. 20, 1937 |
| 2,604,185 | Johnstone et al. | July 22, 1952 |
| 2,684,836 | Arborgh et al. | July 27, 1954 |
| 2,863,521 | Davis | Dec. 9, 1958 |
| 3,085,793 | Pike et al. | Apr. 16, 1963 |

FOREIGN PATENTS

| | | |
|---|---|---|
| 451,312 | Germany | Oct. 19, 1927 |